United States Patent
Li et al.

(10) Patent No.: US 12,127,303 B2
(45) Date of Patent: Oct. 22, 2024

(54) DISCOVERY FRAMES AND GROUP ADDRESSED FRAMES TRANSMISSION

(71) Applicant: Apple Inc., Cupertino, CA (US)

(72) Inventors: Guoqing Li, Campbell, CA (US); Christiaan A. Hartman, San Jose, CA (US); Yong Liu, Cupertino, CA (US); Jarkko L. Kneckt, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/142,149

(22) Filed: May 2, 2023

(65) Prior Publication Data
US 2023/0362628 A1 Nov. 9, 2023

Related U.S. Application Data (63) Continuation of application No. 16/733,489, filed on Jan. 3, 2020, now Pat. No. 11,683,678.
(Continued)

(51) Int. Cl.
| | |
|---|---|
| *H04W 8/26* | (2009.01) |
| *H04L 61/503* | (2022.01) |
| *H04L 61/5038* | (2022.01) |
| *H04L 101/622* | (2022.01) |
| *H04W 76/11* | (2018.01) |

(52) U.S. Cl.
CPC ............ *H04W 8/26* (2013.01); *H04L 61/503* (2022.05); *H04L 61/5038* (2022.05); *H04W 76/11* (2018.02); *H04L 2101/622* (2022.05)

(58) Field of Classification Search
None
See application file for complete search history.

(56) References Cited

U.S. PATENT DOCUMENTS

2006/0252443 A1* 11/2006 Sammour .............. H04W 4/08
455/518
2007/0237120 A1* 10/2007 Xu ........................ H04W 72/23
370/338
(Continued)

OTHER PUBLICATIONS

Huang et al., "11ax D3.0 MAC Comment Resolution for Multiple BSSID," Submission date Sep. 5, 2018 at IEEE 802.11ax Technical Submissions, Bangkok, Thailand, Nov. 2018.
(Continued)

*Primary Examiner* — Srinivasa R Reddivalam
(74) *Attorney, Agent, or Firm* — Sterne, Kessler, Goldstein & Fox P.L.L.C.

(57) ABSTRACT

Some embodiments of this disclosure include apparatuses and methods for implementing discovery frames and group addressed frames communication. For example, some embodiments relate to a method including generating a first frame to be transmitted to a first electronic device. An association identifier (AID) value of the first frame is set to a first value to indicate that the first frame is an individually addressed frame addressed to the first electronic device. The method further includes generating a second frame to be transmitted to a group of one or more electronic devices. An AID value of the second frame is set to a second value different from the first value. The method also includes transmitting the first frame and the second frame.

20 Claims, 9 Drawing Sheets

Related U.S. Application Data (60) Provisional application No. 62/788,529, filed on Jan. 4, 2019.

(56) References Cited

U.S. PATENT DOCUMENTS

| | | | |
|---|---|---|---|
| 2009/0060009 A1* | 3/2009 | Qian | H04L 49/9094 |
| | | | 375/211 |
| 2014/0369301 A1 | 12/2014 | Wu et al. | |
| 2015/0156672 A1 | 6/2015 | Seok et al. | |
| 2016/0037335 A1 | 2/2016 | Jung et al. | |
| 2016/0249208 A1* | 8/2016 | Abraham | H04W 12/02 |
| 2016/0381716 A1* | 12/2016 | Venkatesan | H04W 76/30 |
| | | | 370/328 |
| 2018/0176952 A1 | 6/2018 | Tomeba et al. | |
| 2018/0255589 A1 | 9/2018 | Patil et al. | |
| 2018/0302923 A1 | 10/2018 | Patil et al. | |
| 2019/0373599 A1 | 12/2019 | Ghosh et al. | |
| 2020/0092881 A1 | 3/2020 | Nezou et al. | |
| 2020/0213933 A1* | 7/2020 | Patil | H04W 28/0263 |
| 2020/0221292 A1 | 7/2020 | Li et al. | |
| 2020/0221516 A1 | 7/2020 | Ouchi | |
| 2021/0068197 A1 | 3/2021 | Kim et al. | |

OTHER PUBLICATIONS

Asterjadhi et al., "Comment resolutions for 27.16.1 related to 6 Ghz band," Submission date Sep. 1, 2018.

\* cited by examiner

DISCOVERY FRAMES AND GROUP ADDRESSED FRAMES TRANSMISSION

CROSS-REFERENCE TO RELATED APPLICATIONS

The present application is a continuation U.S. patent application Ser. No. 16/733,489, filed on Jan. 3, 2020, which claims the benefit of U.S. Provisional Patent Application No. 62/788,529, filed on Jan. 4, 2019, both of which are hereby incorporated by reference in their entireties.

BACKGROUND

Field

The described embodiments generally relate to channel access in wireless communications.

Related Art

The popularity of wireless networks continues to increase, including wireless local area networks (WLAN). One wireless communication technique for providing content to multiple devices includes the formation of a multicast group. For example, one device that is the source of the multicast data (e.g., source device, source node, or source) can transmit the multicast data to multiple devices that are members of the multicast group (e.g., sink devices, sink nodes, or sinks.) By using the multicast group and multicast transmission, the resources for generating the data, processing the data, and communicating the data can be shared between multiple devices. Therefore, the overall air time, the air interface capacity, and power consumption can be improved.

According to some examples, the multicast communication can be based on communication techniques compatible with Institute of Electrical and Electronics Engineers (IEEE) 802.11 standards. For example, the multicast communication can be used within a wireless local area Network (WLAN). In this example, one station, such as an access point (AP) can operate as the source device.

SUMMARY

Some embodiments of this disclosure include apparatuses and methods for implementing discovery frames and group addressed frames communication.

Some embodiments relate to a method including generating a first frame to be transmitted to a first electronic device. An association identifier (AID) value of the first frame is set to a first value to indicate that the first frame is an individually addressed frame addressed to the first electronic device. The method further includes generating a second frame to be transmitted to a group of one or more electronic devices. An AID value of the second frame is set to a second value different from the first value. The method also includes transmitting the first frame and the second frame.

Some embodiments relate to a method including aggregating two or more group addressed media access control (MAC) service data units (MSDUs) to generate a physical layer convergence protocol data unit (PPDU) and transmitting the PPDU to a group of one or more electronic devices.

Some embodiments relate to an electronic device. The electronic device includes a transceiver that transmits and receives wireless communications and one or more processors communicatively coupled to the transceiver. The one or more processors generate a first frame to be transmitted to a first electronic device. An association identifier (AID) value of the first frame is set to a first value to indicate that the first frame is an individually addressed frame addressed to the first electronic device. The one or more processors further generate a second frame to be transmitted to a group of one or more electronic devices. An AID value of the second frame is set to a second value different from the first value. The one or more processors further transmit, using the transceiver, the first frame and the second frame.

Some embodiments relate to an electronic device. The electronic device includes a transceiver that transmits and receives wireless communications and one or more processors communicatively coupled to the transceiver. The one or more processors aggregate two or more group addressed media access control (MAC) service data units (MSDUs) to generate a physical layer convergence protocol data unit (PPDU) and transmit, using the transceiver, the PPDU to a group of one or more electronic devices.

Some embodiments relate to a non-transitory computer-readable medium storing instructions. When the instructions are executed by a processor of an electronic device, the instructions cause the processor to perform operations including generating a first frame to be transmitted to a first electronic device. An association identifier (AID) value of the first frame is set to a first value to indicate that the first frame is an individually addressed frame addressed to the first electronic device. The operations further include generating a second frame to be transmitted to a group of one or more electronic devices. An AID value of the second frame is set to a second value different from the first value. The operations further include transmitting the first frame and the second frame.

Some embodiments relate to a non-transitory computer-readable medium storing instructions. When the instructions are executed by a processor of an electronic device, the instructions cause the processor to perform operations including aggregating two or more group addressed media access control (MAC) service data units (MSDUs) to generate a physical layer convergence protocol data unit (PPDU) and transmitting the PPDU to a group of one or more electronic devices.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing discovery frames and group addressed frames communication.

According to some embodiments of this disclosure specific Association identifiers (AID) are used to distinguish between different frames communicated between electronic devices. Additionally, some embodiments of this disclosure are directed to use basic service set (BSS) specific AIDs for transmission of group addressed frames. According to some further embodiments of this disclosure, one or more group addressed frames can be aggregated as broadcast and/or multicast frames.

In general, the information communicated between the electronic devices in the disclosed embodiments may be conveyed in packets or frames that are transmitted and received by radios in the electronic devices in accordance with a communication protocol such as an Institute of Electrical and Electronics Engineers (IEEE) 802.11 standard, Bluetooth™ (from the Bluetooth Special Interest Group of Kirkland, Washington), a cellular-telephone communication protocol, and/or another type of wireless interface (such as a peer-to-peer communication technique. Some of the embodiments are discussed with respect to wireless local area Network (WLAN), but the embodiments of this disclosure are not limited to WLAN.

According to some embodiments, the multicast communication can be implemented using Groupcast with retries (GCR), which is a scalable transmission mechanism that improves reliability of multicast packet delivery. In the multicast communication, a source electronic device is configured to transmit multicast packets (also referred herein as group addressed frames too) (e.g., is configured to multicast the packets) to members of a multicast group. In some examples, the multicast communication does not use any feedback (e.g., acknowledgment) from the members of the multicast group (e.g., the sink electronic devices.) In other words, no acknowledgment from the sink electronic devices is used. In these examples, the source electronic device can be configured to retransmit all or a selected group of the multicast packets without any acknowledgments.

In another example, the multicast communication can use block acknowledgments from the sink electronic devices. In this example, after transmitting the multicast packets, the source electronic device can request block acknowledgments from one or more members of the multicast group. The source electronic device may retransmit the failed multicast packet(s) to the members of the multicast group as retransmitted multicast packet(s) (e.g., group addressed packet(s)/frames). Yet in another example, the multicast communication can use block acknowledgments from the sink electronic devices but the source electronic device may retransmit the failed multicast packet(s) as individually addressed packet(s)/frame(s) to the sink electronic devices that did not receive the multicast packet(s).

In addition to the communication between the source electronic device and the sink electronic devices that are members of a multicast group, the source electronic device can communicate with other associated electronic devices and/or with unassociated electronic device(s). According to some embodiments, the unassociated electronic devices can include electronic devices that are not associated with the source electronic device and/or are not part of a multicast group.

Figure 1:
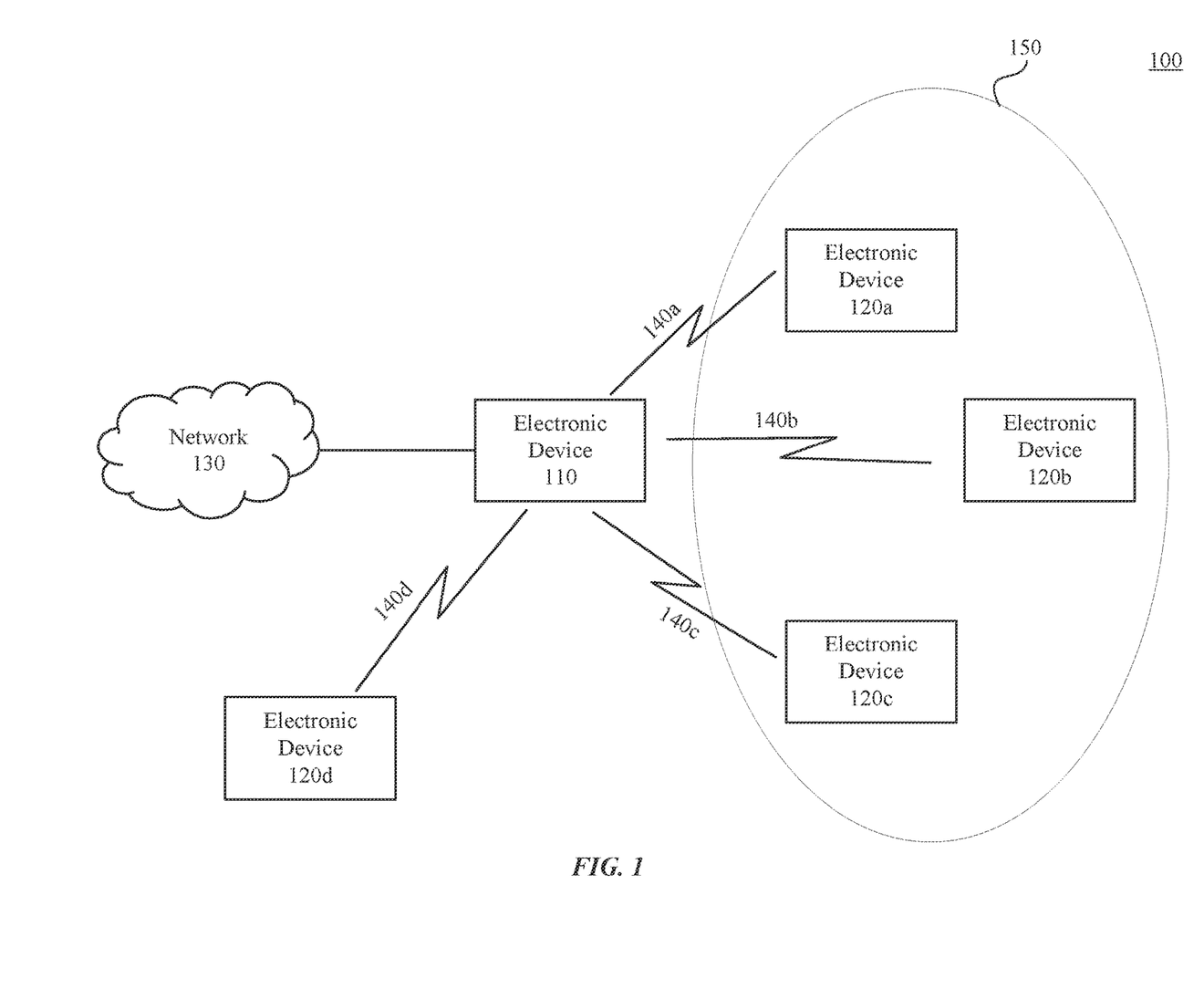
FIG. 1 illustrates an example system implementing discovery frames and group addressed frames communication, according to some embodiments of the disclosure.

FIG. 1 illustrates an example system 100 implementing discovery frames and group addressed frames communication, according to some embodiments of the disclosure. Example system 100 is provided for the purpose of illustration only and does not limit the disclosed embodiments. System 100 may include, but is not limited to, electronic devices 110, 120 and network 130. Electronic devices 110 and 120a-120d may include, but are not limited to, WLAN stations such as wireless communication devices, smart phones, laptops, desktops, tablets, personal assistants, monitors, and televisions. Electronic devices 110 and 120a-120d may support latency sensitive applications (e.g., video and/or audio streaming.)

According to some embodiments, electronic device 110 may include a source electronic device 110 and electronic devices 120a-120c may include sink electronic devices. For example, source electronic device 110 may be an access point (AP) in WLAN or a source device in another source-sink scenario (e.g., in peer-to-peer communication applications.) In this example, source electronic device 110 may include, but is not limited to, WLAN electronic devices such as a wireless router, a wearable device (e.g., a smart watch), a wireless communication device (e.g., a smart phone), or a combination thereof. Network 130 may be the Internet and/or a WLAN.

Source electronic device 110 transmits multicast packets to members of multicast group 150 including electronic devices 120a-120c. The communication between source electronic device 110 and the members of multicast group 150 can take place using wireless communications 140a-140c. The wireless communications 140a-140c can be based on a wide variety of wireless communication techniques. These techniques can include, but are not limited to, techniques based on IEEE 802.11 standards (such as, but not limited to IEEE 802.11v, IEEE 802.11ax, etc.).

Additionally, or alternatively, source electronic device 110 can communicate with electronic device 120d. According to some embodiments, electronic device 120d can be an unassociated electronic device (e.g., an electronic device that is not associated with source electronic device 110 and/or is not part of multicast group 150.) The communication between source electronic device 110 and electronic device 120d can take place using wireless communication 140d. The wireless communication 140d can be based on a wide variety of wireless communication techniques. These techniques can include, but are not limited to, techniques based on IEEE 802.11 standards (such as, but not limited to IEEE 802.11v, IEEE 802.11ax, etc.).

According to some embodiments, the source electronic device can use physical layer convergence protocol data unit (PPDU) to communicate with the sink electronic devices, other associated electronic devices (not shown), and/or the unassociated electronic devices. In a non-limiting example (e.g., used in accordance with IEEE 802.11ax), the electronic devices can use single user (SU) PPDUs and/or multi user (MU) PPDUs to communicate data and information. When communicating with electronic devices 120a-d, source electronic device 110 may use a value for Association ID (AID) to indicate traffic (e.g., any frame transmission) intended for unassociated electronic device 120d. For example, source electronic device 110 can use the value of the AID to indicate that a resource unit (RU) associated with a MU PPDU contains a discovery frame and/or other frames for unassociated electronic device 120d. The traffic can include individually addressed Probe Responses, individually addressed Association Responses, broadcast addressed Probe Responses, fast initial link setup (FILS) Discovery frames, access network query protocol (ANQP) result frames, individually addressed ANQP query result frames, and the like. As a non-liming example, source electronic device 110 can use a value of 2045 for the AID value to indicate an RU in a MU PPDU carrying traffic intended for unassociated electronic device 120d.

According to some embodiments, source electronic device 110 can use different values of AID to indicate different traffic. Source electronic device 110 can use a first value of AID to indicate transmission of broadcast Probe Responses and FILS Discovery frames, according to some embodiments. For example, Source electronic device 110 can use the first value of AID to indicate transmission of broadcast Probe Responses and FILS Discovery frames to members of multicast group 150 including electronic devices 120a-120c and/or unassociated electronic device 120d. For example, if a beacon is transmitted in a MU PPDU, then the first value of AID can identify the RU where the beacon is transmitted. In a non-limiting example, the first value of AID can include the value 2045.

In some embodiments, source electronic device 110 may receive multiple Probe Requests requesting similar information from the source electronic device 110. The source electronic device 110 may decide to respond with an individually addressed Probe Response to a requesting device or with a broadcast addressed Probe Response to multiple requesting devices. To ensure that the requesting device receives the Probe Response, both the individually addressed and broadcast addressed Probe Responses are transmitted with the same AID value.

In some embodiments, a MU PPDU may transmit only broadcast addressed Probe Responses to unassociated electronic devices. This ensures that all devices can receive the Probe Response frame.

In some embodiments, a MU PPDU may transmit an individually addressed Probe Response or an individually addressed ANQP Response to an associated STA in an RU identified by the AID value of the associated STA.

Additionally, source electronic device 110 can use a second value of AID to indicate transmission of all other frames to unassociated electronic device 120d. The other frames can include ANQP query responses, individually addressed Probe Responses, individually addressed Association Responses, and individually addressed Authentication Responses according to some embodiments. In a non-limiting example, the second value of AID can include the value 2044. In some embodiments, unassociated electronic device 120d, which has sent a request to source electronic device 110, receives an individually addressed response transmitted in an RU with the AID having the second value.

In some embodiments, source electronic device 110 may receive multiple ANQP requests that request the same information. The ANQP requests may allow the source electronic device 110 to respond with an individually addressed response to a requesting device or with a broadcast addressed response to all requesting devices. The individually and broadcast addressed can use the second AID value, so that the requesting electronic devices know which RU they should receive in a MU PPDU and the source electronic device 110 has flexibility to select individually or broadcast addressed frame depending on the number of unassociated electronic devices requesting the same information.

A device that receives a preamble of an MU PPDU may decide based on the AID values whether it receives an RU of the MU PPDU or stops receiving the MU PPDU and is available to synchronize with a preamble of other PPDU. For instance, a device that is looking for available BSSs for association may only receive MU PPDUs that contain AID value allocating an RU for transmission of Probe Responses or FILS Discovery frames in the MU PPDU. Alternatively, if an electronic device has transmitted an association request, the electronic device may only receive MU PPDUs that contain AID value allocating an RU for transmission of association response.

Source electronic device 110 is configured to transmit group addressed frames to members of multicast group 150 including electronic devices 120a-120c. According to some embodiments, a first value of AID is associated with the group addressed frames transmitted by source electronic device 110. As a non-limiting example, an AID value of 0 can be used for all group addressed frames transmitted by source electronic device 110. The group addressed frames can be transmitted using SU PPDU, according to some example.

According to some embodiments, the group addressed frames can be transmitted using MU PPDU. Additionally, or alternatively, source electronic device 110 can include a multi basic service set (MultiBSS) access point (AP). According to some embodiments, BSSs are units of devices operating with same medium access characteristics (e.g., radio frequency, modulation scheme, etc.) In some example, source electronic device 110 can include a MultiBSS at 6 GHz. According to some embodiments, source electronic device 110 can be configured to host multiple BSSs and serve the BSSs with the same beacon frame. When multiple BSSs operate in the same channel, source electronic device 110 can transmit group addressed frames separately for each BSS at the channel.

According to one embodiment, an MultiBSS AP may transmit a MU PPDU in which the AID value 0 identifies RU for group addressed frames traffic and AID values of individually addressed frames transmission to an associated electronic device if the group addressed traffic is transmitted to other BSS than the individually addressed traffic.

When a single AID value 0 identifies RU allocated for group addressed frames, then an associated electronic device that receives an MU PPDU will receive the RU that indicates transmission of individually addressed frames. If such RU is not present, then the receiving device will receive the RU allocated for group addressed frames delivery.

According to these examples, group addressed frames associated to each BSS can be assigned their specific AID value. In other words, BSS specific AID value is assigned to transmit the group addressed frames. In some embodiments, using BSS specific AID value can allow transmissions of multiple group addressed frames at the same, or substantially the same, time. According to some embodiments, a new AID of the BSS specific group addressed frames field can be included in the Association Response. This AID value can identify group addressed frames transmission to the associated electronic devices at the BSS. For example, BSS specific group addressed frames AID value can be used in beacons to indicate transmission of buffered broadcast and multicast frames to the BSS. The BSS specific group addressed frames AID value can also be used in downlink (DL) MU PPDU to indicate the transmission of broadcast and multicast frames to the BSS.

Additionally, or alternatively, BSS specific AID value can be assigned to retransmit the group addressed packets. In these embodiments, if retransmission scheme is used, a sink electronic device can detect whether some transmitted packets are retransmission packets and decide whether to receive the packets. According to some examples, block acknowledgment and retransmission can follow individually addressed packets retransmission and/or Groupcast with retries (GCR) block acknowledgment mechanism.

As discussed above, in some embodiments, the group addressed frames can be transmitted using MU PPDU. According to some embodiments, packets associated with different BSSs can be transmitted in the same MU PPDU. Additionally, or alternatively, according to some exemplary embodiments the group addressed frames and individually addressed frames that are associated with the same BSS may not be transmitted in the same MU PPDU.

According to some embodiments, an AID value (such as, but not limited to, 2045) identifies beacon transmission in a MU PPDU, and the other RUs in the MU PPDU may carry individually addressed frames. In some examples, the individually addressed frames can be transmitted to electronic devices (e.g., electronic devices 120a-d) that are in active mode. However, the electronic devices that receive the MU PPDU are rotated. Therefore, the electronic devices are configured to receive the beacons in order to maintain their synchronization with source electronic device 110.

According to some embodiments, the group addressed frames can be transmitted as one media access control (MAC) service data unit (MSDU) per PPDU. Aggregated MSDU (A-MSDU) can be used to transmit individually addressed frames. For example, a Directed Multicast Service (DMS) signaling can be used between source electronic device 110 and electronic device 120a (as one example) to setup a transmission scheme, where a copy of frames from the group addressed frames can be transmitted to electronic device 120a using the individual address of electronic device 120a using A-MSDU. The transmission of the individually addressed copy can be in addition to the transmission of the group addressed frames, according to some embodiments.

According to some embodiments, a PPDU may include one or more MAC protocol data units (MPDUs) and/or one or more aggregated MPDUs (A-MPDUs). For example, a PPDU can include one or more A-MPDU subframes. According to some embodiments, each A-MPDU and/or A-MSDU may be used to aggregate broadcast frames and/or multicast frames. For example, group addressed frames associated with one or more group addresses can be transmitted in an SU PPDU. Additionally, or alternatively, group addressed frames associated with one or more group addresses can be transmitted using RUs in an MU PPDU. According to some embodiments, the aggregation enables the transmitter to control the payload size, which can reduce overheads and assist in increasing the transmission payload to relevant RU sizes in the MU PPDU. According to some embodiments, an A-MPDU aggregates group addressed frames associated with the same BSS. Additionally, or alternatively, an A-MSDU aggregates MSDUs that have same group addressed destination address.

Therefore, A-MPDU and/or A-MSDU can aggregate the BSS specific group addressed frames. One PPDU can carry multiple group addressed MSDUs, according to some embodiments. Electronic devices in a multicast group (e.g., electronic devices 120a-c) and/or an unassociated electronic device (e.g., unassociated electronic device 120d) can receive group addressed frames in A-MPDU and A-MSDU format in HE SU, HE ER SU, SU, and/or MU PPDUs. The electronic devices can use block acknowledgment and retransmissions for group addressed frames. However, if an electronic device supports block acknowledgment and retransmissions for group addressed frames, the electronic device may select not to activate them.

In some embodiments, the minimum number of MPDUs that can be aggregated to an A-MPDU can be specified. As a non-limiting example, in IEEE 802.11ax, an electronic device operating in 6 GHz can be capable to receive an A-MPDU that aggregates 8 or less MPDUs. According to some embodiments, a maximum number of the MPDUs in an A-MPDU can be signaled during an acknowledgment scheme setup (for example, using Add Block Acknowledgment (ADDBA) request/response frames.) ADDBA signaling can set up the block acknowledgment transmission scheme and can enable a transmitter (e.g., source electronic device 110) to request block acknowledgment to determine whether sink electronic devices have received the transmitted packets. In some embodiments, ADDBA can be used to define a window size, number of MPDUs, and whether a receiver device is capable of receiving and/or acknowledging.

According to some embodiments, the electronic devices 120a-d and 110 can communicate their block acknowledgment and retransmissions for group addressed frames. For example, the electronic device 120 may set a Group Addressed Retransmission Capability field value to a first value (e.g., 1) to indicate that the electronic device 120 is capable to use block acknowledgment and retransmissions for group addressed frames. In some embodiments, the electronic device 120 can use a frame in Association, Beacon, and/or Probe Response frames to signal its capability.

According to some embodiments, a Group Addressed Retransmission Activated field value can be set to a first value (e.g., 1) to indicate in transmitted (re)-association request and/or (re)-association response frames that a block acknowledgment agreement is established between the source electronic device 110 and the electronic device 120. In some examples, the source electronic device 110 can be the transmitter for the Group Addressed Retransmission Activated field value and the electronic device 120 can be receiver. The electronic device 120 attempts to receive the transmitted group addressed frames and can transmit block acknowledgment, as requested by the source electronic device.

According to some embodiments, the source electronic device 110 can assign an AID value that identifies the RUs in MU PPDU allocated for the GCR multicast retransmissions and for GCR MU BAR frames. In some examples, if an electronic device 120 is not interested to receive retransmissions, it is not required to receive these frames. In some embodiments, the GCR MU BAR is a trigger frame requesting block acknowledgments for the transmitted group addressed frames. An electronic device 120 may establish block acknowledgment later using ADDBA signaling.

Figure 5A:
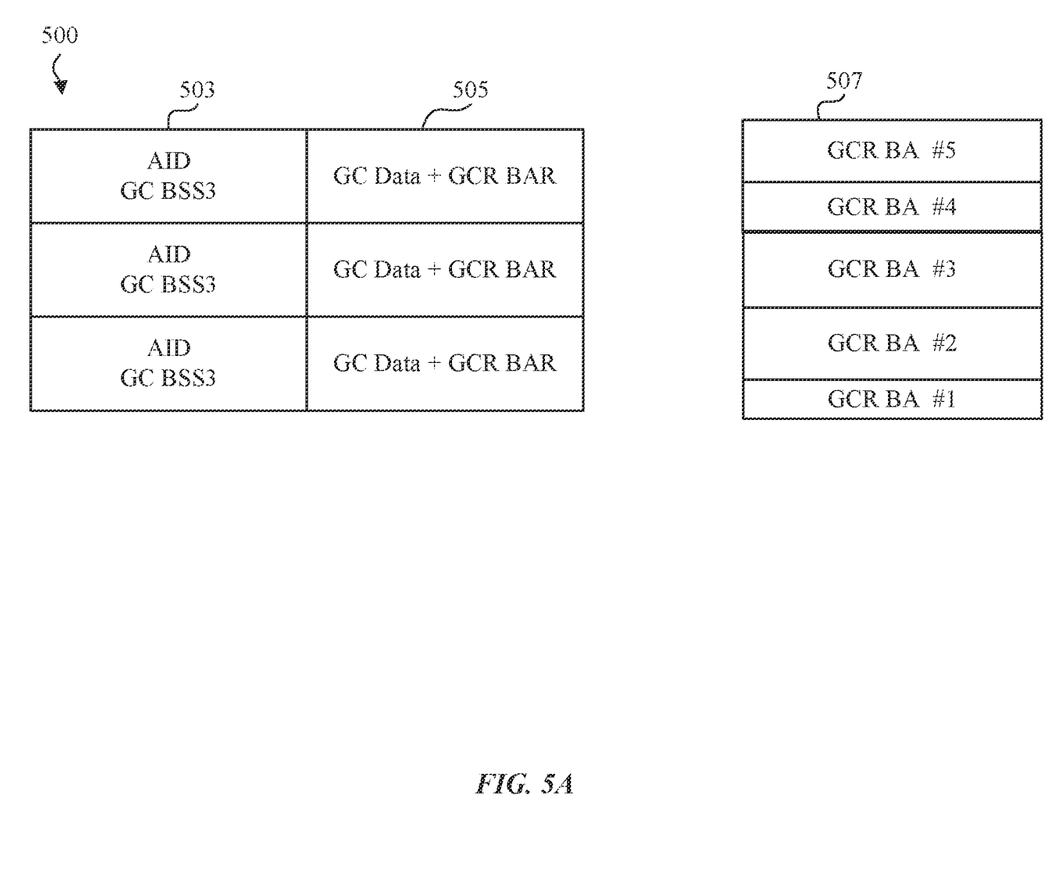
FIGS. 5A-5B illustrate exemplary methods to request block acknowledgments for group addressed frames, according to some embodiments of the disclosure.

In some exemplary embodiments, the source electronic device 110 can use different methods to request block acknowledgments for group addressed frames. In one example, as illustrated in FIG. 5A, the source electronic device 110 may transmit a MU PPDU 500 to transmit data and request for block acknowledgments for group addressed frames. MU PPDU 500 can include MU preamble 503 and data 505. MU preamble 503 can include BSS specific AID for group addressed frames, according to some embodiments. The data 505 can include group addressed frames and GCR block acknowledgment request (BAR) frames, which specify the electronic devices 120 from which block acknowledgement is requested, and the RUs to transmit the block acknowledgments. FIG. 5A also illustrates a PPDU 507 (e.g., a high efficiency (HE) Triggered PPDU) that includes the block acknowledgments.

Figure 5B:
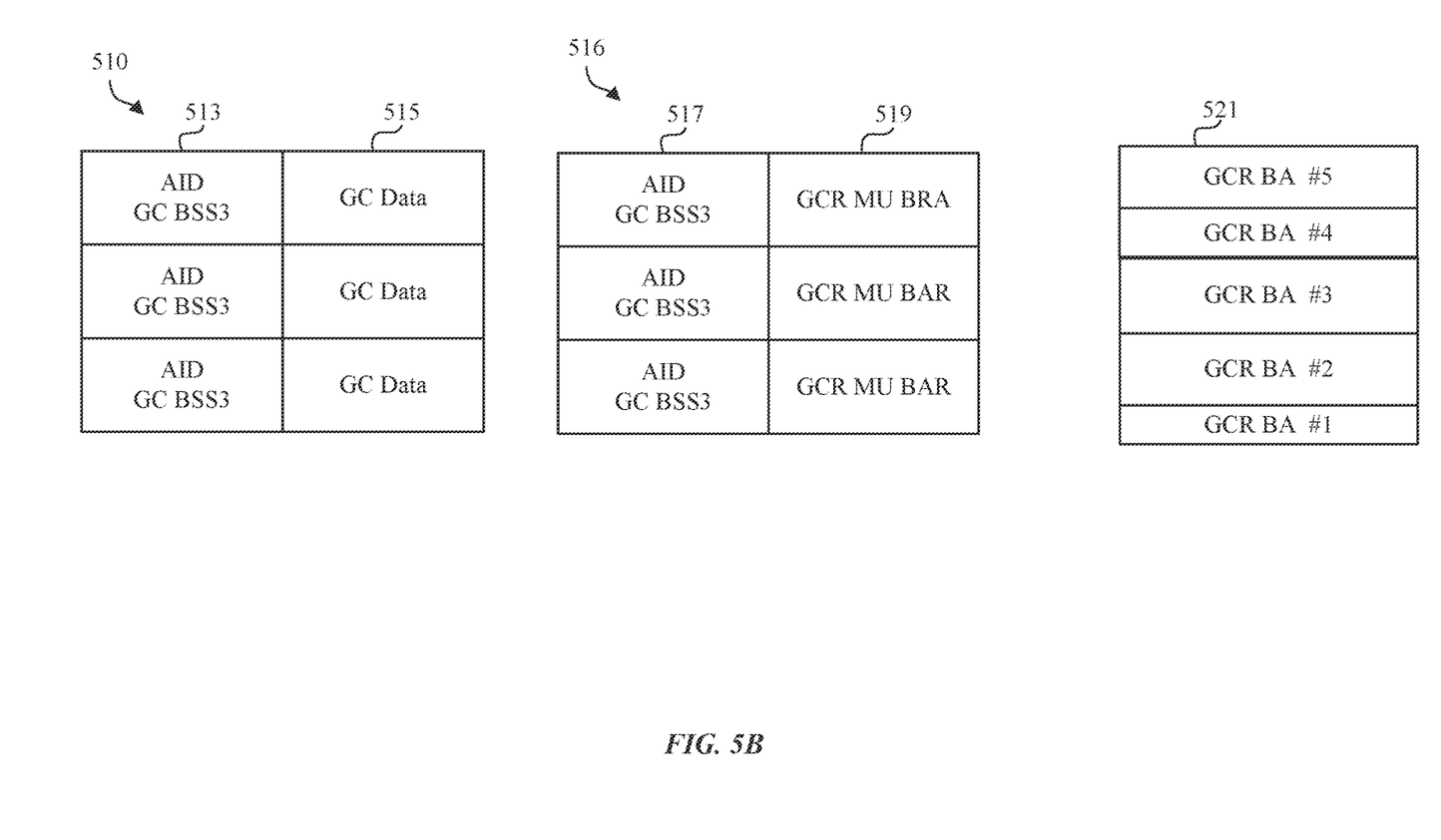

Additionally, or alternatively, and as illustrated in FIG. 5B, the source electronic device 120 may transmit MU PPDU 510 to transmit the group addressed frames. MU PPDU 510 may include MU preamble 513 and data 515. MU preamble 513 can include BSS specific AID for group addressed frames, according to some embodiments. The data 515 can include the group addressed frames. After MU PPDU 510, the source electronic device 110 may transmit MU PPDU 516. MU PPDU 516 can include MU preamble 517 and data 519. MU preamble 517 can include BSS specific AID for transmission and/or retransmission group addressed frames, according to some embodiments. The data 519 can include GCR block acknowledgment request (BAR) frames that specify the electronic devices 120 that acknowledge and the RUs to transmit the block acknowledgments. FIG. 5B also illustrates a PPDU 521 (e.g., a HE Triggered PPDU) that includes the block acknowledgments.

According to some embodiments, the maximum number of group addressed MPDUs in an A-MPDU that a receiver (e.g., sink electronic device 120a) is configured to receive can be signaled using association signaling. For example, when sink electronic device 120a is in the process of associating with source electronic device 110, sink electronic device 120a uses the association signaling to inform source electronic device 110 of the maximum number of group addressed MPDUs in an A-MPDU that sink electronic device 120a is configured to receive. According to some embodiments, source electronic device 110 can use the smallest number of MPDUs supported by all the receivers. For example, source electronic device 110 can use the smallest number of MPDUs supported by sink electronic devices 120a-c of multicast group 150. In these exemplary embodiments, source electronic device 110 selects the maximum number of group addressed MPDUs in an A-MPDU such that sink electronic devices 120a-c can receive the group addressed multicast packets. In a non-limiting example using IEEE 802.11ax, an EHT device can be capable of receiving 64 or more group addressed MPDUs in an A-MPDU. In this example, 20 MHz-devices can be capable of receiving 8 or more group addressed MPDUs in an A-MPDU. Internet of things (IoT) devices may have limited capabilities.

In some exemplary embodiments, a sink electronic device such as an IoT device may not be configured to receive group addressed MPDUs in an A-MPDU. This IoT device can request that some group addressed frames not to be aggregated because this IoT device may not be capable to receive group addressed MPDUs in the A-MPDU. According to some examples, the IoT device can signal its inability to receive group addressed MPDUs in the A-MPDU to source electronic device 110 using Association request frame.

According to some embodiments, source electronic device 110 may transmit a copy of the group addressed frames to an individual address of the IoT device using, for example DMS mechanism. Source electronic device 110 may transmit the group addressed frames in A-MPDU to other sink electronic devices. In some examples, this process can be a default process for source electronic device 110. This process can help the IoT device to keep its power consumption low as the IoT device can avoid receiving group addressed multicast packets.

Additionally, or alternatively, source electronic device 110 may transmit the group addressed frames for the IoT device, and other sink electronic device(s) in the multicast group with the IoT device, without aggregation. In some example, same SU PPDU can be used for the IoT device and other sink electronic device(s) in the multicast group with the IoT device. According to some embodiments, source electronic device 110 may not use A-MSDU for any group addressed multicast packets. As a non-limiting example, source electronic device 110 that has multiple associated IoT devices may not use A-MSDU for any group addressed multicast packets.

According to some exemplary embodiments, A-MSDU can be used to aggregate group addressed MSDUs. For example, source electronic device 110 can be configured to use A-MSDU to aggregate group addressed MSDUs. According to some example, the aggregated MSDUs have the same receiver address. In other words, the aggregated MSDUs are transmitted to the same group address. In some examples, the aggregation of MSDUs is different than the aggregation of MPDUs as the MSDUs addressed to the same MAC address are aggregated.

Figure 2:
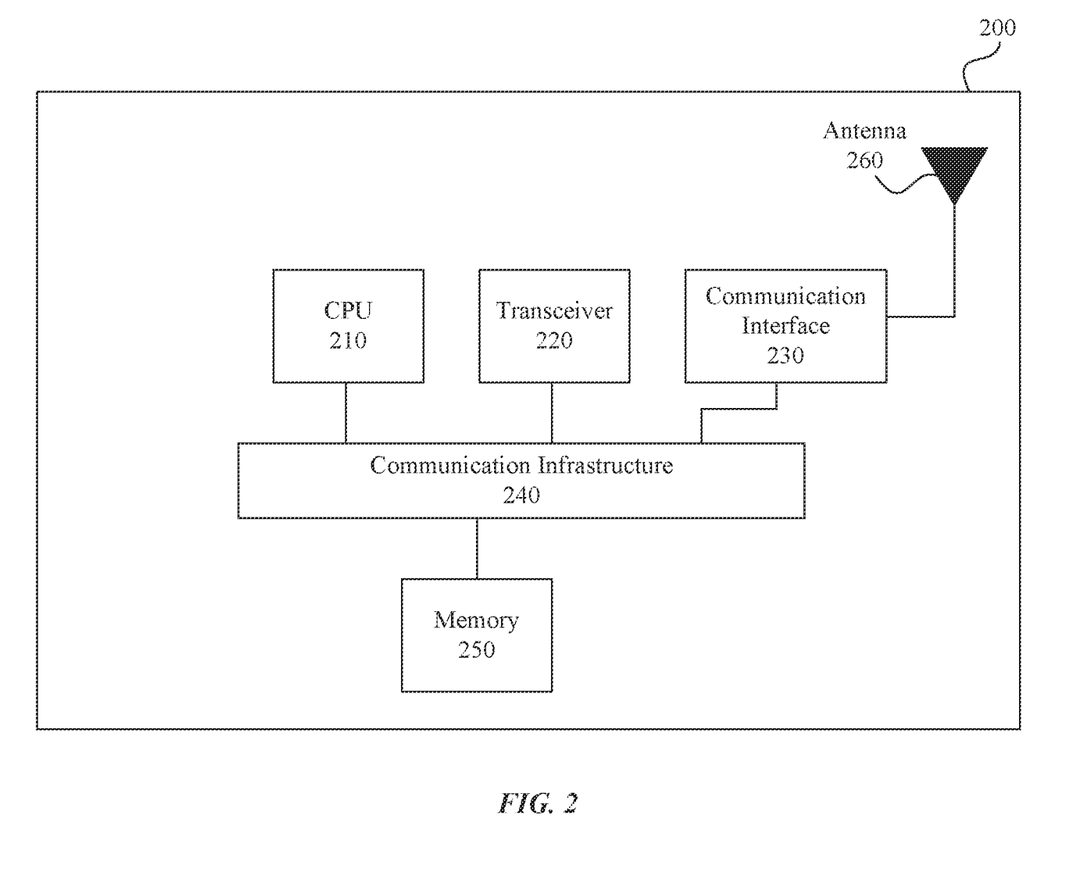
FIG. 2 illustrates a block diagram of an example wireless system of an electronic device implementing discovery frames and group addressed frames communication, according to some embodiments of the disclosure.

FIG. 2 illustrates a block diagram of an example wireless system 200 of an electronic device implementing discovery frames and group addressed frames communication, according to some embodiments of the disclosure. System 200 may be any of the electronic devices (e.g., electronic devices 110, 120) of system 100.

System 200 includes processor (e.g., a central processing unit (CPU)) 210, transceiver 220, communication interface 230, communication infrastructure 240, memory 250, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, an operating system (not shown) can be stored in memory 250 and can manage transfer of data from memory 250 and/or one or more applications (not shown) to processor 210, transceiver 220, and/or communication interface 230. In some examples, the operating system maintains one or more network protocol stacks (e.g., Internet protocol stack, cellular protocol stack, and the like)

that can include a number of logical layers. At corresponding layers of the protocol stack, the operating system includes control mechanism and data structures to perform the functions associated with that layer.

In addition to or in alternate to the operating system, system 200 can include communication infrastructure 240. Communication infrastructure 240 provides communication between, for example, processor 210, transceiver 220, communication interface 230, and memory 250. Communication infrastructure 240 may be a bus. processor 210 together with instructions stored in memory 250 perform operations enabling wireless system 200 to implement the discovery frames and group addressed frames communication operation(s) as described herein.

Transceiver 220 transmits and receives communications signals that support discovery frames and group addressed frames communication, according to some embodiments, and may be coupled to antenna 260. Antenna 260 may include one or more antennas that may be the same or different types. Communication interface 230 allows system 200 to communicate with other devices that may be wired and/or wireless. Transceiver 220 and/or communication interface 230 can include processors, controllers, radios, sockets, plugs, and like circuits/devices used for connecting to and communication on networks. According to some examples, transceiver 220 and/or communication interface 230 includes one or more circuits to connect to and communicate on wired and/or wireless networks. Transceiver 220 and/or communication interface 230 can include a cellular subsystem, a WLAN subsystem, and a Bluetooth™ subsystem, each including its own radio transceiver and protocol(s) as will be understood by those skilled arts based on the discussion provided herein. Transceiver 220 and/or communication interface 230 can include more or less systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to networks based on standards described in IEEE 802.11 (such as, but not limited, IEEE 802.11, IEEE 802.11v, IEEE 802.11ax, etc.)

According to some embodiments, processor 210, alone or in combination with instructions stored on memory 250, transceiver 220, and/or communication interface 230, implements the discovery frames and group addressed frames communication, as discussed herein.

Figure 3A:
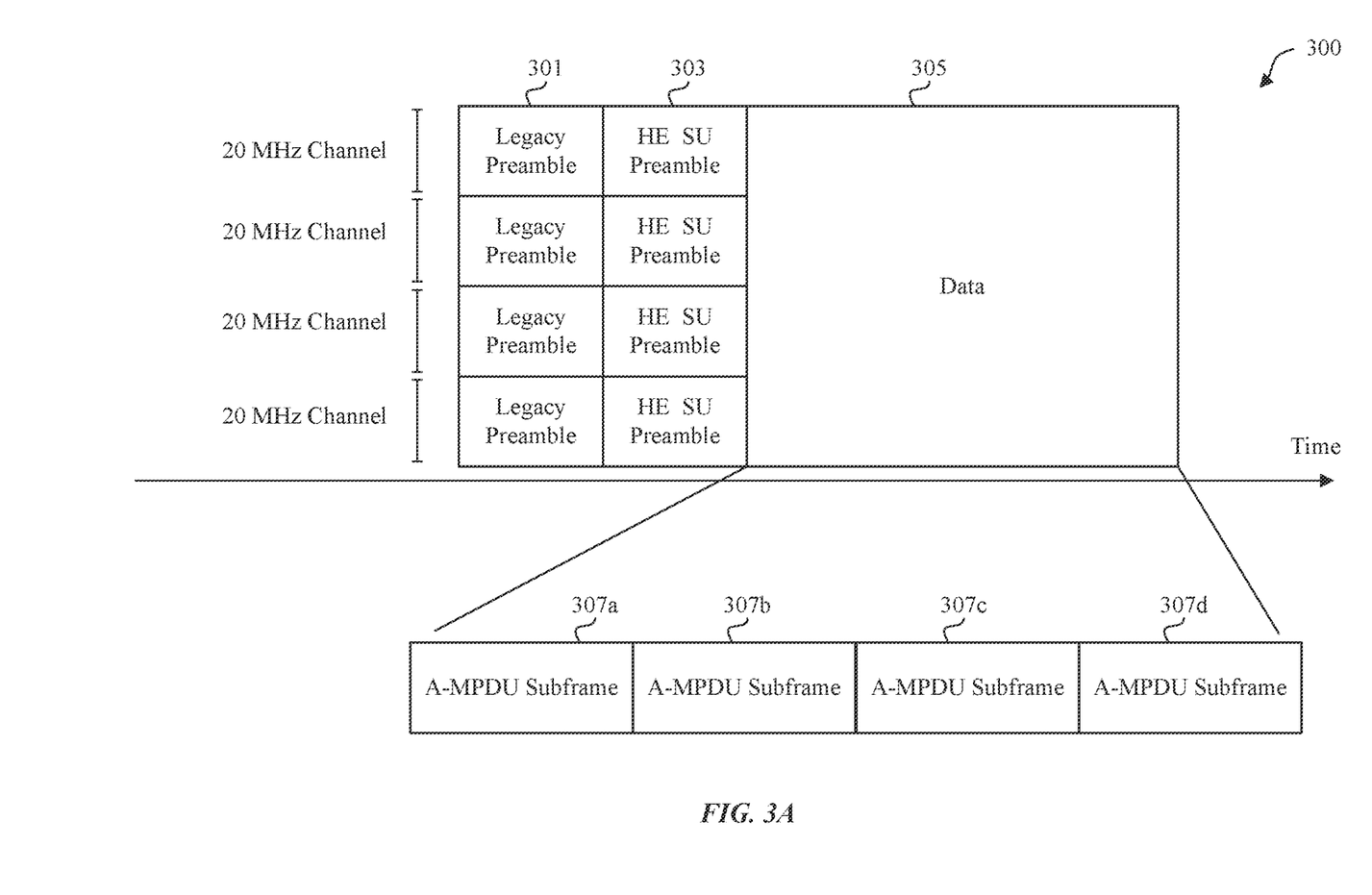
FIG. 3A illustrates an exemplary HE SU PPDU for implementing discovery frames and group addressed frames communication, according to some embodiments of the disclosure.

According to some embodiments, four high efficiency (HE) PPDU formats can be defined: HE SU PPDU, HE MU PPDU, HE ER SU PPDU and HE TB PPDU. FIG. 3A illustrates an exemplary HE SU PPDU for implementing discovery frames and group addressed frames communication, according to some embodiments of the disclosure. HE SU PPDU 300 can be used for SU transmission.

According to some embodiments, HE SU PPDU 300 includes one or more legacy preambles 301, one or more HE SU preamble 303, and data 305. Each of the legacy preamble 301 and/or the HE SU preamble 303 may be spread over a 20 MHz channel, according to some examples. However, the embodiments of this disclosure are not limited to these channels. According to some embodiments, the data 305 of HE SU PPDU 300 can include one or more A-MPDU subframes 307a-307d, as discussed above. In some embodiments, if an electronic device (e.g., electronic devices 110 and/or 120a-120d) receives HE SU PPDU 300, the electronic device receives the whole data 305 of the HE SU PPDU 300. In some exemplary embodiments, HE SU PPDU 300 can also include a packet extension (PE) field (not shown) after the data 305.

Figure 3B:
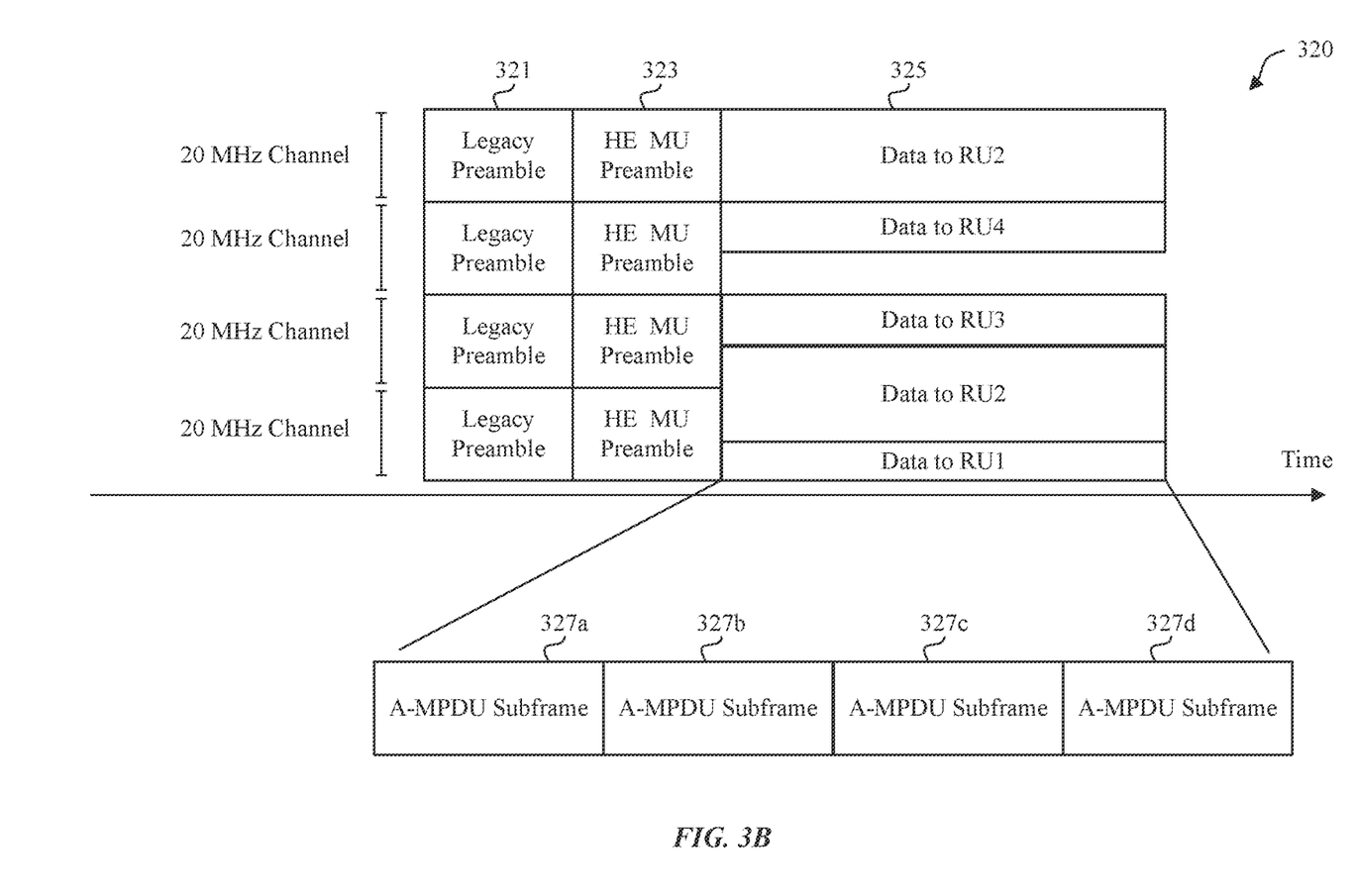
FIG. 3B illustrates an exemplary HE MU PPDU for implementing discovery frames and group addressed frames communication, according to some embodiments of the disclosure.

FIG. 3B illustrates an exemplary HE MU PPDU 320 for implementing discovery frames and group addressed frames communication, according to some embodiments of the disclosure. HE MU PPDU 320 can be used for transmission to one or more users if the PPDU is not a response of a Trigger frame. According to some embodiments, HE MU PPDU 320 includes one or more legacy preambles 321, one or more HE MU preamble 323, and data 325. Each of the legacy preamble 321 and/or the HE MU preamble 323 may be spread over a 20 MHz channel, according to some examples. However, the embodiments of this disclosure are not limited to these channels. According to some embodiments, the data 325 of HE MU PPDU 320 can include data for different resource units (RUs). In other words, each RU contains associated data. Data for each RU can include one or more A-MPDU subframes 327a-327d, as discussed above. In some embodiments, if an electronic device (e.g., electronic devices 110 and/or 120a-120d) receives HE MU PPDU 320, the electronic device receives a single RU that has AID value in HE MU preamble 323, which the electronic device is receiving. The RUs may be specified in spatial streams as in MU MIMO or in frequency as in OFDMA transmissions. In some exemplary embodiments, HE MU PPDU 320 can also include a packet extension (PE) field after the data 325.

The legacy preambles 301, 321, the HE SU preambles 303, and the HE MU preambles 323 can include one or more parts as defined, for example, in IEEE 802.11ax. According to some embodiment, HE ER SU PPDU can also be defined and can be used for SU transmission. Additionally, HE TB PPDU can also be defined and can be used for a transmission that is a response to a Trigger frame or a frame carrying a TRS Control subfield from an AP.

Figure 4A:
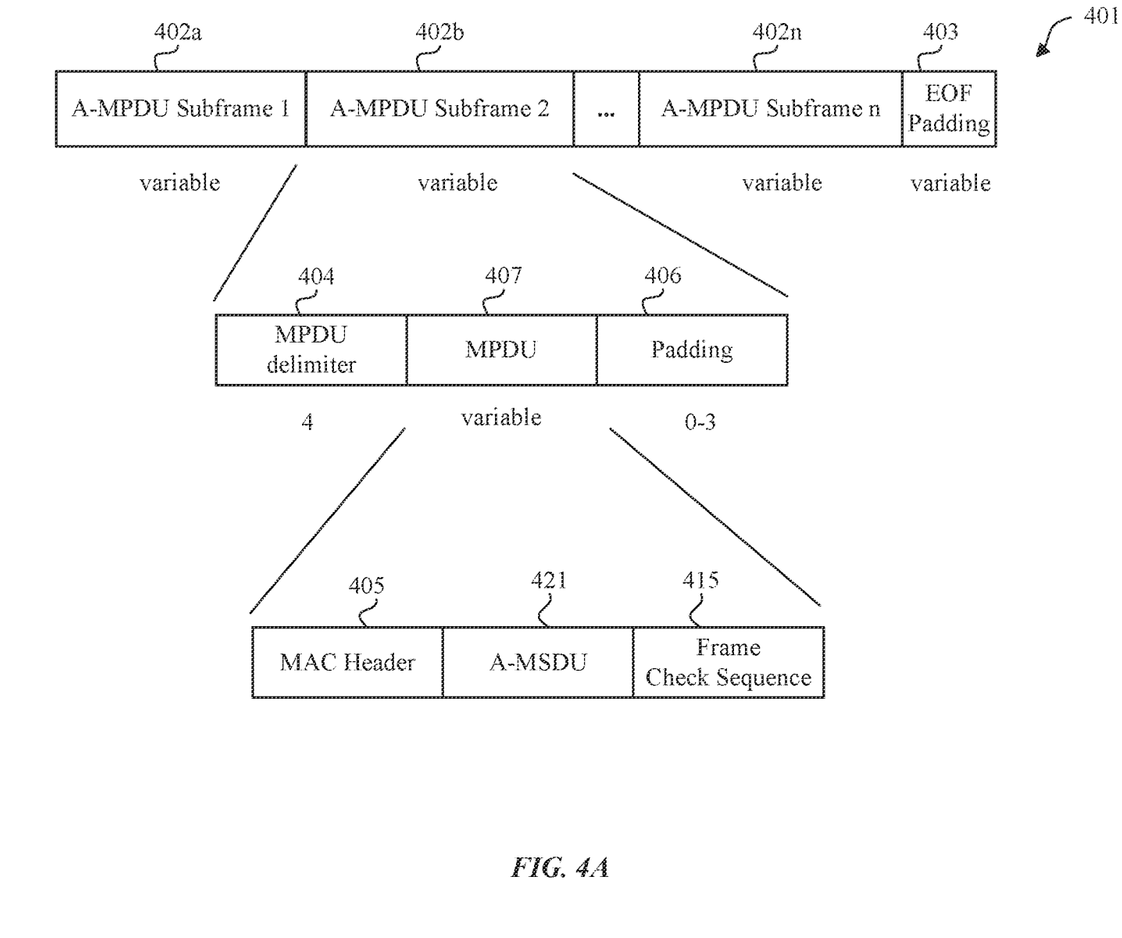
FIG. 4A illustrates an example A-MPDU format, according to some embodiments of the disclosure.

FIG. 4A illustrates an example A-MPDU format, according to some embodiments of the disclosure. For example, FIG. 4A illustrates an exemplary format of A-MPDU 401. According to some embodiments, A-MPDU 401 includes a sequence of one or more A-MPDU subframes 402a-n and a variable amount of end of frame (EOF) padding 403. The numbers (here illustrated as variable) under each field of A-MPDU 401 represent an exemplary size of the respective field of A-MPDU 401 in octets.

Each A-MPDU subframe (e.g., A-MPDU subframe 402b) can include MPDU delimiter 404 optionally followed by an MPDU 407. Each nonfinal A-MPDU subframe in an A-MPDU has padding 406 appended. The numbers under each field of A-MPDU subframe 402 represent an exemplary size of the respective field in bytes.

MPDU delimiter 404 can include one or more fields such as an end of frame indication, information on MPDU length, cyclic redundancy checks (CRC), and/or a unique pattern. Padding 406 can include frame check sequence (FCS) for error-detection and/or additional padding (e.g., 0 to 3 bytes) to compensate for different lengths of different MPDUs. MPDU 407 can include media access control (MAC) header 405, MAC service data unit (MSDU) and/or aggregated MSDU (A-MDSU) 421, and frame check sequence (FCS) 415, according to some embodiments. If MPDU 407 includes A-MSDU 421, the A-MSDU can include one or more A-MSDU subframes, where each A-MSDU subframe can include an A-MSDU subframe header, an MSDU, and a padding, according to some embodiments. A-MSDU 421 is discussed below with respect to FIG. 4B.

MPDU 407 containing the A-MSDU 421 can be carried in any of the following data frame subtypes: QoS Data, QoS Data +CF-Ack, QoS Data +CF-Poll, QoS Data +CF-Ack +CF-Poll. The A-MSDU structure 421 can be contained in the frame body of a single MPDU 407, according to some embodiments.

According to some embodiments, when A-MPDU 401 carries group addressed MSDUs or A-MSDUs 421, MPDUs 407 may have same source address and may be transmitted to a group address. MPDUs 407 in A-MPDU 401 can be transmitted in a sequence number order. In other words, the smallest sequence number can be transmitted first. According to some example, MPDUs 407 in A-MPDU 401 can have the same TID value.

Figure 4B:
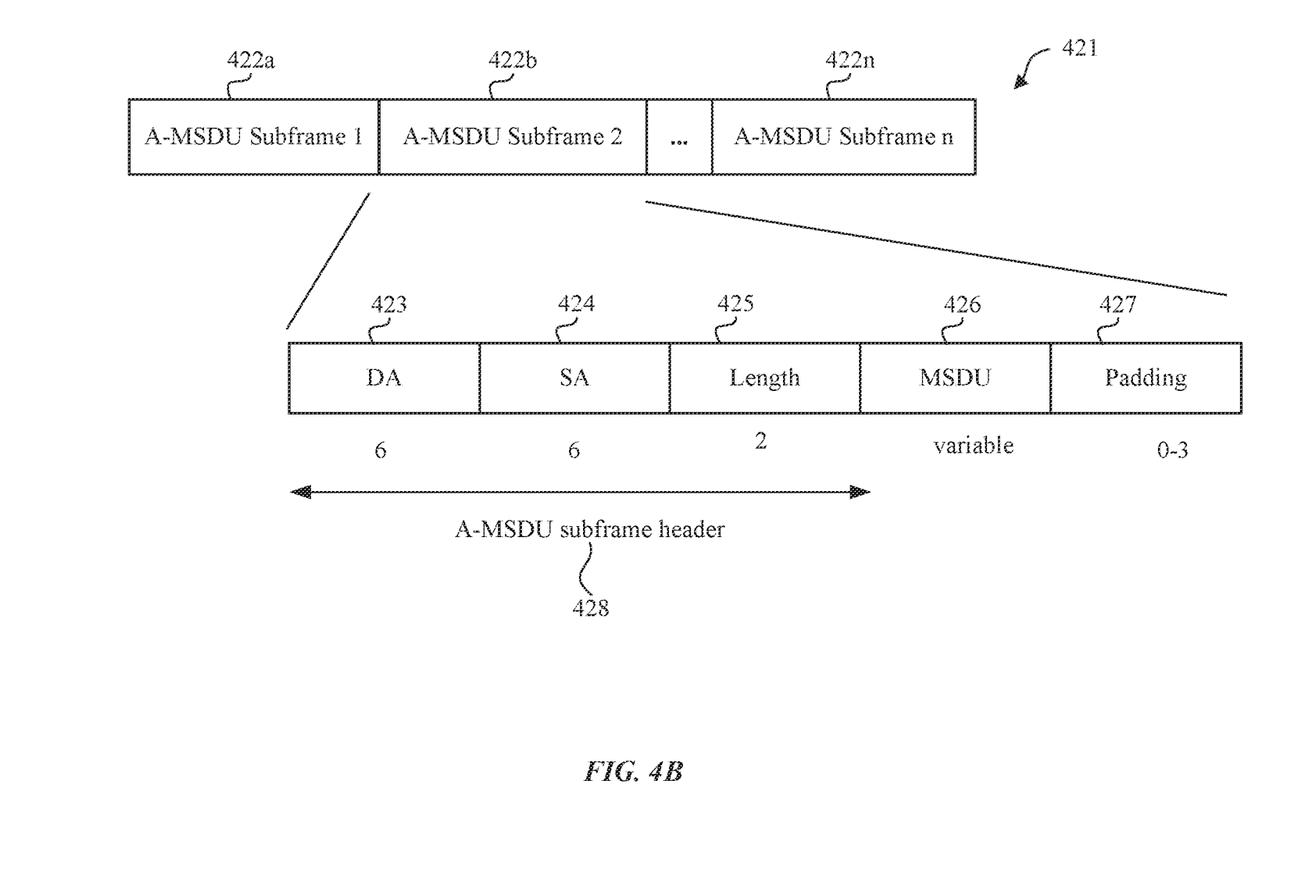
FIG. 4B illustrates an example A-MSDU format, according to some embodiments of the disclosure.

FIG. 4B illustrates an example A-MSDU format, according to some embodiments of the disclosure. For example, FIG. 4B illustrates an exemplary format of A-MSDU 421. According to some embodiments, A-MSDU 421 includes a sequence of one or more A-MSDU subframes 422a-n.

Each A-MSDU subframe 422 can include one or more of a basic A-MSDU subframe, a short A-MSDU subframe, or a dynamic A-MSDU subframe. The structure of a basic A-MSDU is illustrated in FIG. 4B. For example, A-MSDU 422b can include A-MSDU subframe header 428 followed by MSDU 426 and padding 427, according to some embodiments. The numbers under each field of A-MSDU subframe 422 represent an exemplary size of the respective field in bytes. In some examples, the last A-MSDU subframe (e.g., A-MSDU subframe 422n of A-MSDU 421) has no padding.

According to some embodiments, A-MSDU subframe header 428 can include three fields: destination address (DA) 423, source address (SA) 424, and Length 425. According to some examples, length field 425 contains the length in octets of the MSDU 426.

According to some embodiments, A-MSDU 421 includes MSDUs 426 whose DA 423 and SA 424 parameter values map to the same receiver address (RA) and transmitter address (TA) values. The rules for determining RA and TA can be independent of whether the frame body carries an A-MSDU. Additionally, or alternatively, it is possible to have different DA 423 and SA 424 parameter values in A-MSDU subframe headers 428 of the same A-MSDU 421 as long as they map to the same Address 1 and Address 2 parameter values.

According to some embodiments, if A-MSDU subframe 422 is a short A-MSDU subframe, A-MSDU subframe 422 may have a length field, MSDU field, and a padding field. According to some embodiments, if A-MSDU subframe 422 is a dynamic A-MSDU subframe, A-MSDU subframe 422 may have a subframe control field, optional DA field, optional SA field, MSDU field, and a padding field.

According to some embodiments, when A-MSDU 421 carries group addressed MSDUs 426, SA 424 of A-MSDU subframes 422 may be set to the BSSID. Additionally, or alternatively, A-MSDU 421 may contain MSDUs 426 associated with the same group address. In some examples, MSDUs 426 can be aggregated to A-MSDU 421 in a sequence number order. In other words, the smallest sequence number can be aggregated first. In a non-limiting example, the size of MSDU 426 may be limited to 2304 octets. According to some embodiments, the same TID value may be used for the MSDUs 426.

Figure 6:
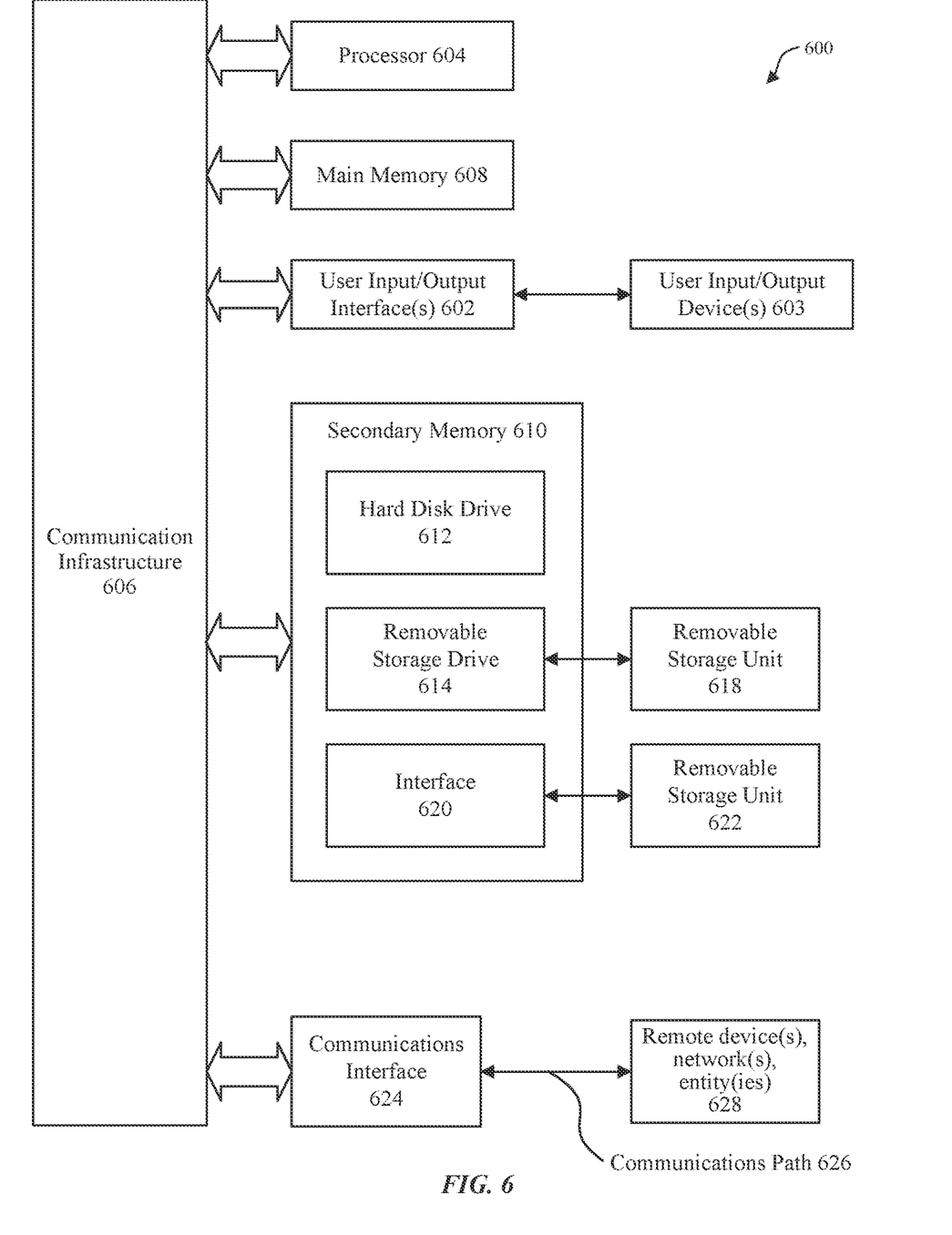
FIG. 6 is an example computer system for implementing some embodiments or portion(s) thereof.

Various embodiments can be implemented, for example, using one or more computer systems, such as computer system 600 shown in FIG. 6. Computer system 600 can be any well-known computer capable of performing the functions described herein such as devices 110, 120 of FIG. 1, or 200 of FIG. 2. Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some embodiments, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method performed by a source electronic device, the method comprising:
    generating, by the source electronic device, a frame by:
        aggregating two or more group addressed media access control (MAC) service data units (MSDUs) to generate a first group addressed MAC protocol data unit (MPDU), wherein the two or more group addressed MSDUs have a same receiver address; and
        aggregating the first group addressed MPDU and a second group addressed MPDU to generate a physical layer convergence protocol data unit (PPDU) to generate the frame, wherein the first group addressed MPDU and the second group addressed MPDU are associated with a same basic service set (BSS),
        wherein a maximum number of group addressed MDPUs that are being aggregated does not exceed a smallest number of group addressed MDPUs that any of a plurality of sink electronic devices is configured to receive; and
    transmitting, by the source electronic device, the frame.

2. The method of claim 1, wherein the PPDU comprises at least one of a single user (SU) PPDU or a multi user (MU) PPDU.

3. The method of claim 1, wherein the first group addressed MPDU and the second group addressed MPDU have a same source address and are transmitted to a group address.

4. The method of claim 1, wherein the transmitting the frame comprises transmitting the first group addressed MPDU and the second group addressed MPDU in a sequence number order.

5. The method of claim 1, further comprising:
    receiving, by the source electronic device and from each of the plurality of sink electronic devices, a number of group addressed MPDUs in the frame that the corresponding sink electronic device is configured to receive.

6. The method of claim 1, wherein a source address associated with the two or more group addressed MSDUs is set to a BSS identifier of the source electronic device.

7. The method of claim 1, wherein the frame further includes a Groupcast with retries (GCR) block acknowledgment request (BAR) frame that specifies one or more sink electronic devices that are to provide a respective acknowledgement and one or more resource units (RUs) to transmit a block acknowledgment.

8. The method of claim 1, further comprising:
    transmitting a second frame wherein the second frame includes a Groupcast with retries (GCR) block acknowledgment request (BAR) frame that specifies one or more sink electronic devices that are to provide a respective acknowledgement and one or more resource units (RUs) to transmit a block acknowledgment.

9. A source electronic device, comprising:
    a transceiver configured to transmit and receive wireless communications; and
    one or more processors communicatively coupled to the transceiver and configured to:
        aggregate two or more group addressed media access control (MAC) service data units (MSDUs) to generate a first group addressed MAC protocol data unit (MPDU), wherein the two or more group addressed MSDUs have a same receiver address;
        aggregate the first group addressed MPDU and a second group addressed MPDU to generate a physical layer convergence protocol data unit (PPDU) to generate a frame, wherein the first group addressed MPDU and the second group addressed MPDU are associated with a same basic service set (BSS), wherein a maximum number of group addressed MDPUs that are being aggregated does not exceed a smallest number of group addressed MDPUs that any of a plurality of sink electronic devices is configured to receive; and transmit, using the transceiver, the frame.

10. The source electronic device of claim 9, wherein the PPDU comprises at least one of a single user (SU) PPDU or a multi user (MU) PPDU.

11. The source electronic device of claim 9, wherein the first group addressed MPDU and the second group addressed MPDU have a same source address and are transmitted to a group address.

12. The source electronic device of claim 9, wherein to transmit the frame, the one or more processors are configured to transmit, using the transceiver, the first group addressed MPDU and the second group addressed MPDU in a sequence number order.

13. The source electronic device of claim 9, wherein the one or more processors are further configured to:

receive, from each of the plurality of sink electronic devices, a number of group addressed MPDUs in the frame that the corresponding sink electronic device is configured to receive.

14. The source electronic device of claim 9, wherein a source address associated with the two or more group addressed MSDUs is set to a BSS identifier of the source electronic device.

15. The source electronic device of claim 9, wherein the frame further includes a Groupcast with retries (GCR) block acknowledgment request (BAR) frame that specifies one or more sink electronic devices that are to provide a respective acknowledgement and one or more resource units (RUs) to transmit a block acknowledgment.

16. The source electronic device of claim 9, wherein the one or more processors are further configured to:

transmit, using the transceiver, a second frame wherein the second frame includes a Groupcast with retries (GCR) block acknowledgment request (BAR) frame that specifies one or more sink electronic devices that are to provide a respective acknowledgement and one or more resource units (RUs) to transmit a block acknowledgment.

17. A non-transitory computer-readable medium storing instructions that, when executed by a processor of a source electronic device, cause the source device to perform operations, the operations comprising:

generating a frame by:

aggregating two or more group addressed media access control (MAC) service data units (MSDUs) to generate a first group addressed MAC protocol data unit (MPDU), wherein the two or more group addressed MSDUs have a same receiver address; and aggregating the first group addressed MPDU and a second group addressed MPDU to generate a physical layer convergence protocol data unit (PPDU) to generate the frame, wherein the first group addressed MPDU and the second group addressed MPDU are associated with a same basic service set (BSS), wherein a maximum number of group addressed MDPUs that are being aggregated does not exceed a smallest number of group addressed MDPUs that any of a plurality of sink electronic devices is configured to receive; and transmitting the frame.

18. The non-transitory computer-readable medium of claim 17, the operations further comprising:

receiving, from each of the plurality of sink electronic devices, a number of group addressed MPDUs in the frame that the corresponding sink electronic device is configured to receive.

19. The non-transitory computer-readable medium of claim 17, wherein the frame further includes a Groupcast with retries (GCR) block acknowledgment request (BAR) frame that specifies one or more sink electronic devices that are to provide a respective acknowledgement and one or more resource units (RUs) to transmit a block acknowledgment.

20. The non-transitory computer-readable medium of claim 17, the operations further comprising:

transmitting a second frame wherein the second frame includes a Groupcast with retries (GCR) block acknowledgment request (BAR) frame that specifies one or more sink electronic devices that are to provide a respective acknowledgement and one or more resource units (RUs) to transmit a block acknowledgment.

* * * * *